(12) United States Patent
Hung

(10) Patent No.: US 9,229,171 B2
(45) Date of Patent: Jan. 5, 2016

(54) OPTICAL COMMUNICATION DEVICE

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 112 days.

(21) Appl. No.: 14/083,460

(22) Filed: Nov. 19, 2013

(65) Prior Publication Data
US 2015/0049985 A1 Feb. 19, 2015

(30) Foreign Application Priority Data
Aug. 14, 2013 (TW) .............................. 102129211 A

(51) Int. Cl.
G02B 6/34 (2006.01)
G02B 6/32 (2006.01)
G02B 6/43 (2006.01)

(52) U.S. Cl.
CPC .... *G02B 6/32* (2013.01); *G02B 6/43* (2013.01)

(58) Field of Classification Search
USPC ............................................................ 385/53
See application file for complete search history.

(56) References Cited

U.S. PATENT DOCUMENTS 9,011,020 B2 * 4/2015 Ty Tan et al. .................. 385/53

* cited by examiner

*Primary Examiner* — Eric Wong
(74) *Attorney, Agent, or Firm* — Novak Druce Connolly Bove + Quigg LLP

(57) ABSTRACT

An optical communication device includes a first fiber, a second fiber, a light-emitting unit, a light receiving unit, and a lens unit. The first fiber and the second fiber are located at two opposite sides of the lens unit. The lens unit includes a first entrance surface, a first exit surface, a first reflecting surface, a second entrance surface, a second exit surface, and a second reflecting surface. The first entrance surface is perpendicular to the first exit surface. An included angle between the first entrance surface and the first reflecting surface is 45 degrees. The second entrance surface is perpendicular to the second exit surface. An included angle between the second entrance surface and the second reflecting surface is 45 degrees. The first reflecting surface is perpendicular to the second reflecting surface. The first entrance surface and the second exit surface are coplanar.

7 Claims, 5 Drawing Sheets

OPTICAL COMMUNICATION DEVICE

BACKGROUND

1. Technical Field

The present disclosure relates to communication devices, and particularly to an optical communication device.

2. Description of Related Art

Optical communication devices include optical fibers, light-emitting units, a lens unit, and light-receiving units. The lens unit is configured for coupling the optical fibers to the light-emitting units and the light-receiving units.

The lens unit includes an entrance lens and an exit lens. The entrance lens and the exit lens are on a same surface of the lens unit. Thus, the entrance optical fibers and the exit optical fibers are on the same side of the lens unit. The optical communication devices include many optical fibers, the lens unit can not have enough area for setting the entrance lens and the exit lens.

Therefore, it is desirable to provide an optical communication device that can overcome the limitation described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
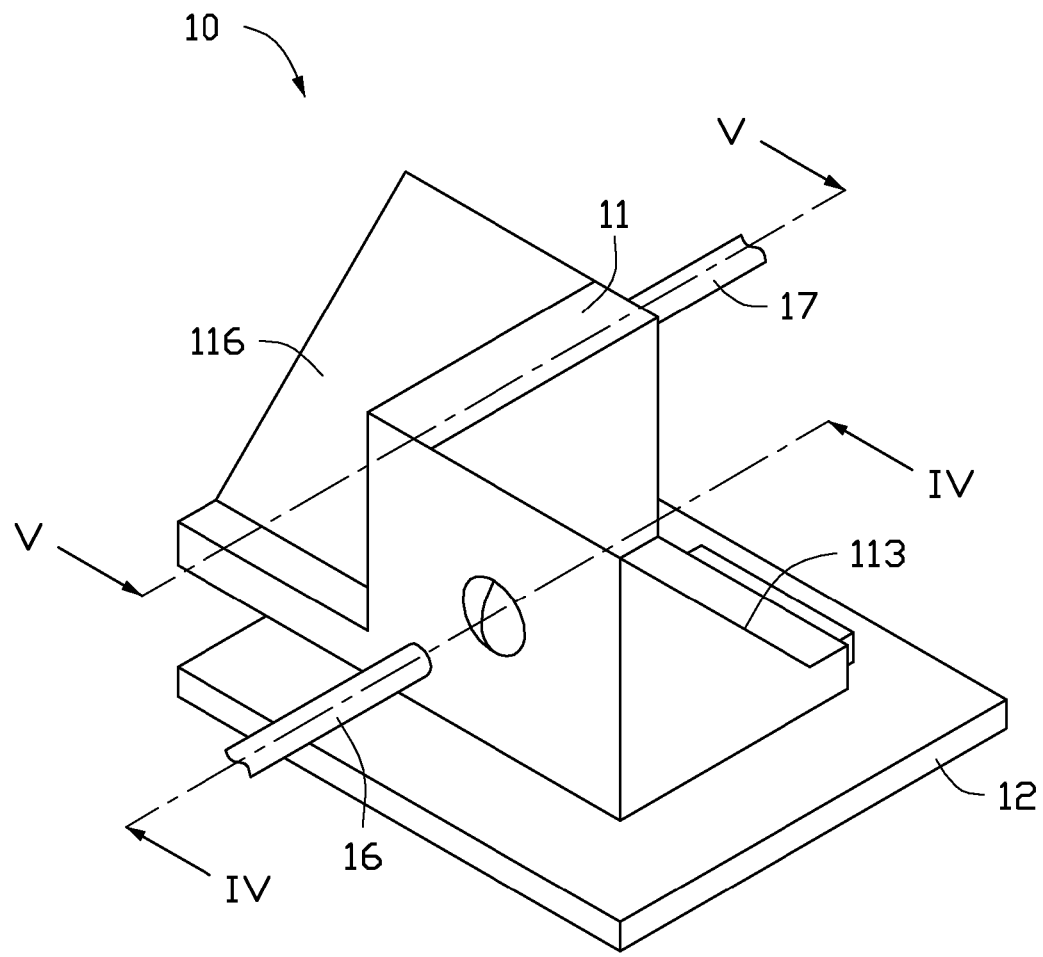
FIG. 1 is a schematic view of an optical communication device, according to an exemplary embodiment of the present disclosure
Figure 2:
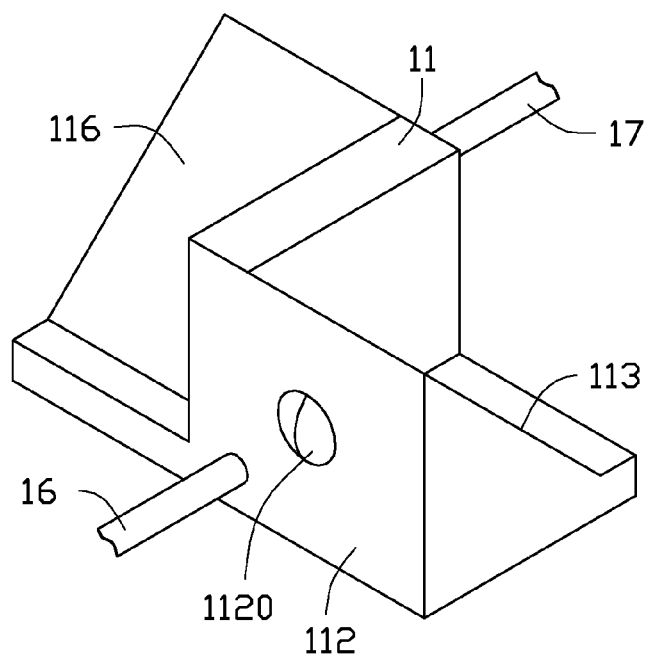
FIG. 2 is an exploded view of the optical communication device of FIG. 1.
Figure 2:
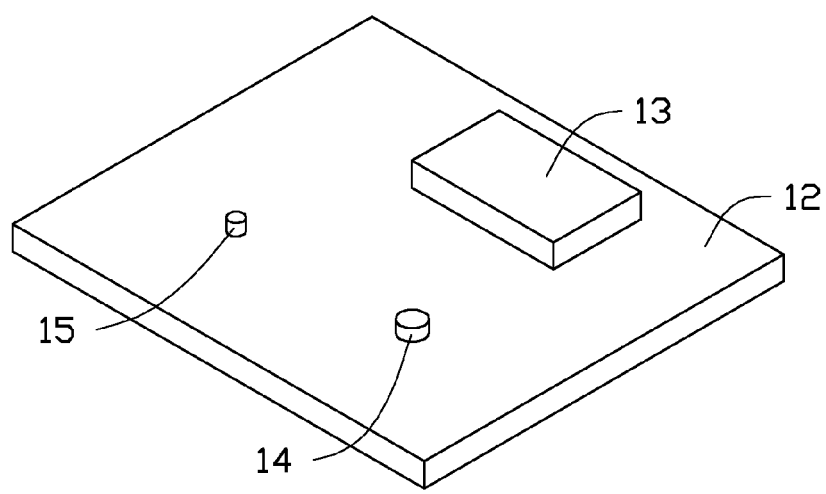
Figure 3:
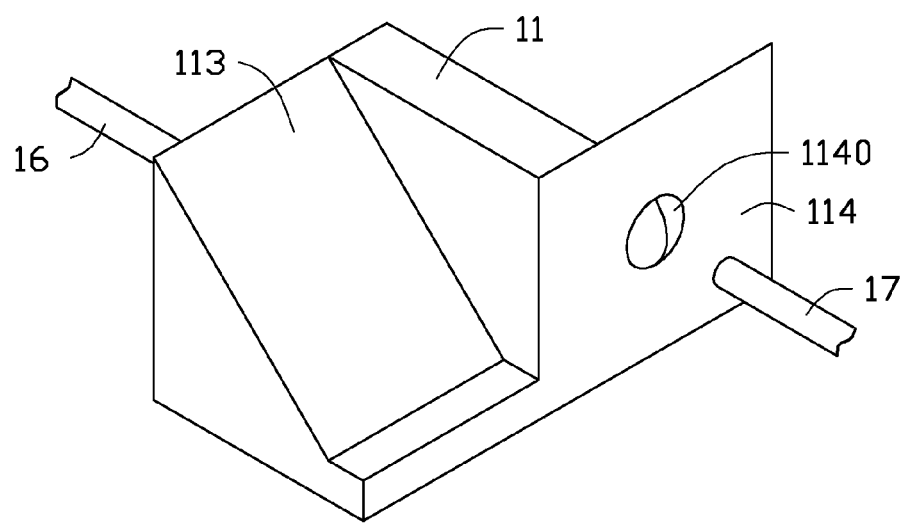
FIG. 3 is another exploded view of the optical communication device of FIG. 1.
Figure 3:
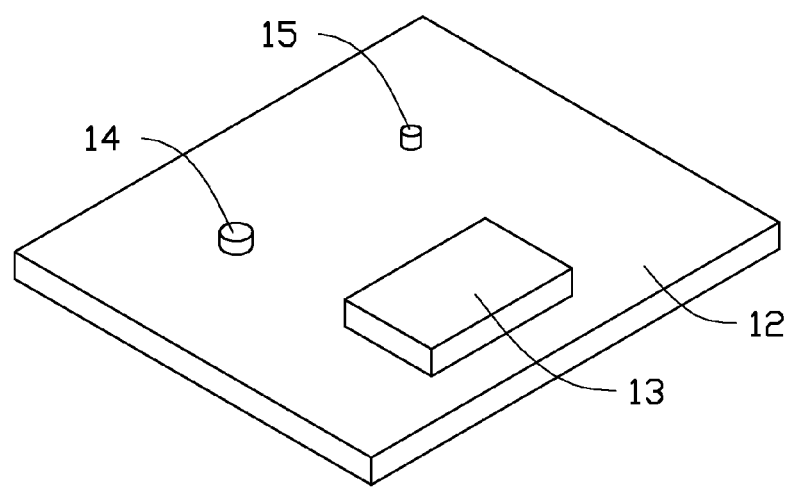

FIGS. 1-3 show an exemplary embodiment of an optical communication device 10. The optical communication device 10 includes a lens unit 11, a circuit board 12, a processor 13, a light-emitting unit 14, a light-receiving unit 15, a first optical fiber 16, and a second optical fiber 17.

The processor 13, the light-emitting unit 14, and the light-receiving unit 15 are located on and electrically connected to the circuit board 12. The processor 13 is configured for controlling the light-emitting unit 14 and the light-receiving unit 15. The first optical fiber 16 and the second optical fiber 17 face opposite sides of the lens unit 11.

Light emitted by the light-emitting unit 14 passes through the lens unit 11 and is coupled to the first optical fiber 16. Light transferred by the second optical fiber 17 passes through the lens unit 11 and is coupled to the light-receiving unit 15.

The circuit board 12 can be a hard circuit board or a flexible circuit board. The light-emitting unit 14 can be a light-emitting diode or a laser diode. The light-receiving unit 15 is a photodiode.

Figure 4:
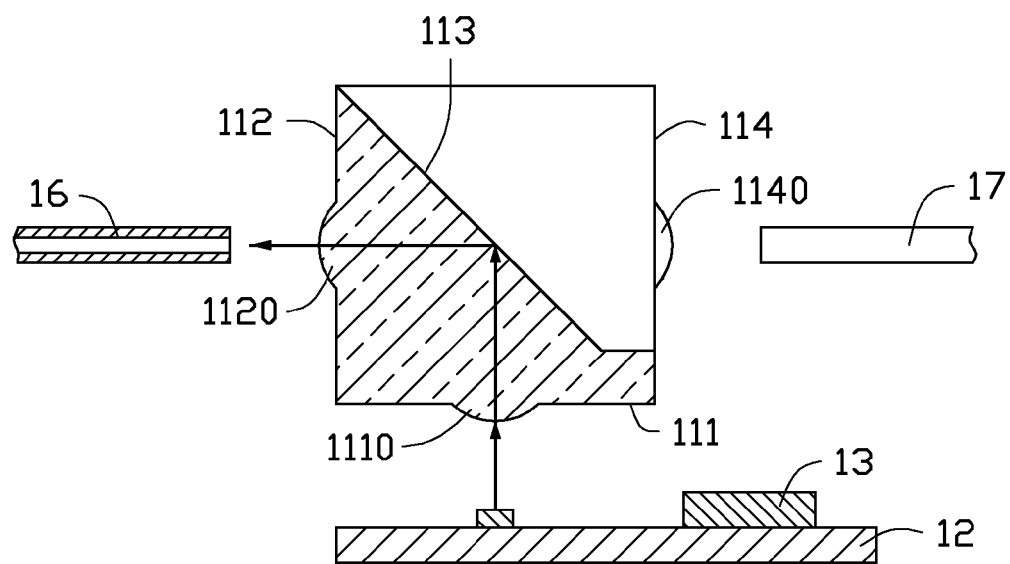
FIG. 4 is a cross-sectional view of the optical communication device, taken along line IV-IV of FIG. 1.
Figure 5:
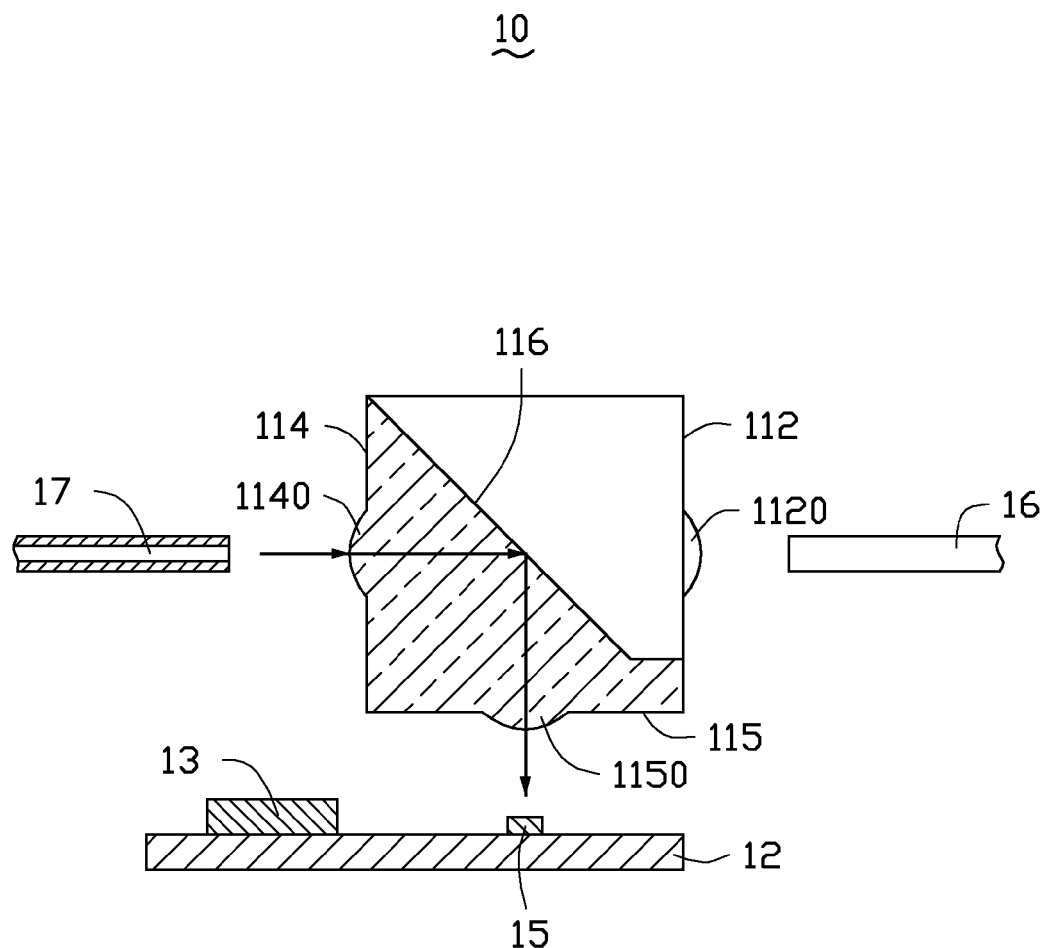
FIG. 5 is a cross-sectional view of the optical communication device, taken along V-V of FIG. 1.

Referring to FIGS. 4 and 5, the lens unit 11 includes a first entrance surface 111, a first exit surface 112, a first reflecting surface 113, a second entrance surface 114, a second exit surface 115, and a second reflecting surface 116.

An included angle between the first reflecting surface 113 and the first entrance surface 111 is 45 degrees, and an included angle between the first reflecting surface 113 and the first exit surface 112 is also 45 degrees. The first entrance surface 111 is perpendicular to the first exit surface 112. An included angle between the second reflecting surface 116 and the second entrance surface 114 is 45 degrees, and an included angle between the second reflecting 116 and the second exit surface 115 is also 45 degrees. The second entrance surface 114 is perpendicular to the second exit surface 115. The first entrance surface 111 and the second exit surface 115 are coplanar. The first exit surface 112 is parallel to the second entrance surface 114. The first exit surface 112 and the second entrance surface 114 are located on two opposite sides of the first reflecting surface 113. The first reflecting surface 113 is perpendicular to the second reflecting surface 116.

One first entrance lens 1110 is formed on the first entrance surface 111, and one first exit lens 1120 is formed on the first exit surface 112. Light emitted by the light-emitting unit 14 is emitted onto the first reflecting surface 113 through the first entrance lens 1110. The light is reflected by the first reflecting surface 113 to the first exit lens 1120 to entrance the first optical fiber 16.

In other embodiments, there can be two or more of the first entrance lenses 1110 and the first exit lenses 1120. A number of the first optical fiber 16 and a number of the light-emitting unit 14 correspond to a number of the first entrance lenses 1110.

One second entrance lens 1140 is formed on the second entrance surface 114, and one second exit lens 1150 is formed on the second exit surface 115. Light transferred by the second optical fiber 17 emits onto the second reflecting surface 116 through the second entrance lens 1140. After the light is reflected by the second reflecting surface 116, the light exits from the lens unit 11 through the second exit lens 1150. The light-receiving unit 15 receives the light.

The lens unit 11 includes the first reflecting surface 113 and the second reflecting surface 116. The first reflecting surface 113 is perpendicular to the second reflecting surface 116. The first reflecting surface 113 reflects light coming from a first direction, and the second reflecting surface 116 reflects light coming from a second direction opposite to the first direction. Thus, the first optical fiber 16 and the second optical fiber 17 are located on opposite sides of the lens unit 11. Even if the optical communication device 10 includes two or more first optical fibers 16 and second optical fibers 17, the lens unit 11 can have enough area for setting the first entrance lens 1110, the first exit lens 1120, the second entrance lens 1140, and the second exit lens 1150.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical communication device, comprising:
   a first optical fiber;
   a second optical fiber;
   a light-emitting unit;
   a light-receiving unit; and
   a lens unit, the lens unit comprising a first entrance surface, a first exit surface, a first reflecting surface, a second entrance, a second exit surface, and a second reflecting surface, the first entrance surface perpendicular to the first exit surface, an included angle between the first entrance surface and the first reflecting surface being 45 degrees, the second entrance surface perpendicular to the second exit surface, an included angle between the second entrance surface and the second reflecting surface being 45 degrees, the first reflecting surface perpendicular to the second reflecting surface, the first entrance surface and the second exit surface being coplanar, the first exit surface being opposite to the second entrance surface, and the first exit surface being parallel with the second entrance surface, the first exit surface connected between the first entrance surface and the first reflecting surface, all of the first exit surface, the first entrance surface, and the first reflecting surface substantially arranged in triangular shape, the second entrance surface connected between the second exit surface and the second reflecting surface, all of the second entrance surface, the second exit surface, and the second reflecting surface substantially arranged in triangular shape;

wherein the light-emitting unit and the light-receiving unit are on the same side of the lens unit, the first optical fiber and the second optical fiber are on different sides of the lens unit, light emitted from the light-emitting unit irradiates the first reflecting surface through the first entrance surface and then reflected by the first reflecting surface through the first exit surface to the first optical fiber, light emitted by the second optical fiber irradiates the second reflecting surface through the second entrance surface and then reflected by the second reflecting surface through the second exit surface to the light-receiving unit, and the light-receiving unit receives the light.

2. The optical communication device of claim 1, comprising a circuit board, the light-emitting unit and the light-receiving unit being electrically located on the circuit board.

3. The optical communication device of claim 2, wherein the light-emitting unit is selected from a group consisting of light-emitting diode and laser diode.

4. The optical communication device of claim 2, comprising a processor electrically connected with the light-emitting unit and the light-receiving unit and located on the circuit board.

5. The optical communication device of claim 2, wherein the circuit board is selected from the group consisting of hard circuit board and flexible circuit board.

6. The optical communication device of claim 1, wherein the first entrance surface comprises a first entrance lens, the first exit surface comprises a first exit lens, the light emitted by the light-emitting unit is emitted onto the first reflecting surface through the first entrance surface and is reflected by the first reflecting surface to the first exit lens to entrance the first optical fiber.

7. The optical communication device of claim 6, wherein the second entrance surface comprises a second entrance lens, the second exit surface comprises a second exit lens, the light transferred by the second optical fiber emits onto the second reflecting surface through the second entrance lens and is received by the light-emitting unit through the second exit lens after being reflected by the second reflecting surface.

* * * * *